US011089370B1

(12) United States Patent
Glaeser et al.

(10) Patent No.: US 11,089,370 B1
(45) Date of Patent: *Aug. 10, 2021

(54) DELIVERING ARTIST MESSAGES TO LISTENERS BASED ON PREDICTED RESPONSES

(71) Applicant: PANDORA MEDIA, LLC, Oakland, CA (US)

(72) Inventors: Katrina Glaeser, Oakland, CA (US); Monica D. Bhole, Union City, CA (US)

(73) Assignee: PANDORA MEDIA, LLC, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,648

(22) Filed: Mar. 31, 2020

Related U.S. Application Data

(63) Continuation of application No. 16/037,633, filed on Jul. 17, 2018, now Pat. No. 10,645,455.

(Continued)

(51) Int. Cl.
*H04N 5/445* (2011.01)
*H04N 21/466* (2011.01)
(Continued)

(52) U.S. Cl.
CPC ......... *H04N 21/4666* (2013.01); *G06N 20/00* (2019.01); *H04N 21/25841* (2013.01); *H04N 21/4668* (2013.01); *H04N 21/4826* (2013.01)

(58) Field of Classification Search
CPC ......... H04N 21/4666; H04N 21/25841; H04N 21/4668; H04N 21/4826; G06N 20/00
(Continued)

(56) References Cited

U.S. PATENT DOCUMENTS 8,296,172 B2  10/2012  Marci et al.
9,406,072 B2   8/2016  Whitman
(Continued)

FOREIGN PATENT DOCUMENTS

WO  WO-2012/116236  8/2012
WO  WO-2013/077983  5/2013
WO  WO-2015/073565  5/2015

OTHER PUBLICATIONS

Business Wire, "Twitch Partners with Gameloft for First Ever Mobile Streaming Experience", Retrieved from the internet <<URL: https://www.businesswire.com/news/home/20140317005246/en/Twitch-Partners--Gameloft-Mobile-Streaming-Experience>>, Mar. 17, 2014, 4 pages.

(Continued)

*Primary Examiner* — Jefferey F Harold
*Assistant Examiner* — Sahar Aqil Riaz
(74) *Attorney, Agent, or Firm* — Fenwick & West LLP

(57) ABSTRACT

A digital content provider that provides content channels to users via a computer network selects an artist message. The content provider retrieves a predictive model trained to calculate an artist affinity score indicating a likelihood that a given user will provide positive feedback to a given artist message. The predictive model is trained, using machine learning, based on feedback from users for previous plays of artist messages. The content provider retrieves artist features describing the artist who recorded the artist message, and user features describing a candidate user. The content provider calculates an artist affinity score for the candidate user and selected artist message using the predictive model. The content provider determines to play a content item by the artist to the candidate user, determines to play the selected artist message associated with the content item based on the (Continued)

artist affinity score, and transmits the artist message and content item.

20 Claims, 4 Drawing Sheets

Related U.S. Application Data

(60) Provisional application No. 62/533,618, filed on Jul. 17, 2017.

(51) Int. Cl.
  *H04N 21/482* (2011.01)
  *G06N 20/00* (2019.01)
  *H04N 21/258* (2011.01)

(58) Field of Classification Search
  USPC .......................................................... 725/46
  See application file for complete search history.

(56) References Cited

U.S. PATENT DOCUMENTS

| | | | |
|---|---|---|---|
| 9,538,249 | B2 | 1/2017 | Dankberg et al. |
| 9,607,278 | B2 | 3/2017 | Zaveri |
| 9,681,105 | B2 | 6/2017 | Walker |
| 9,807,183 | B2 | 10/2017 | Maguire et al. |
| 9,868,056 | B2 | 1/2018 | Kehoe et al. |
| 10,049,656 | B1 | 8/2018 | Barton et al. |
| 10,410,222 | B2 | 9/2019 | Brueck et al. |
| 10,448,115 | B1 | 10/2019 | Jamal et al. |
| 2006/0195516 | A1* | 8/2006 | Beaupre ................ H04L 67/22 709/203 |
| 2006/0212900 | A1 | 9/2006 | Ismail et al. |
| 2008/0242221 | A1 | 10/2008 | Shapiro et al. |
| 2008/0281448 | A1 | 11/2008 | Uhrig et al. |
| 2009/0265356 | A1 | 10/2009 | Hyman et al. |
| 2010/0211439 | A1 | 8/2010 | Marci et al. |
| 2012/0246174 | A1* | 9/2012 | Spears ................ G06F 16/285 707/749 |
| 2014/0047335 | A1 | 2/2014 | Lewis et al. |
| 2014/0088952 | A1 | 3/2014 | Fife et al. |
| 2014/0136554 | A1* | 5/2014 | Moradi ................ G06F 16/435 707/754 |
| 2014/0195376 | A1 | 7/2014 | Nemetz et al. |
| 2014/0282709 | A1 | 9/2014 | Hardy et al. |
| 2015/0365725 | A1 | 12/2015 | Belyaev et al. |
| 2016/0071182 | A1* | 3/2016 | Nogues ................ G06F 16/435 705/26.7 |
| 2016/0132905 | A1 | 5/2016 | Richards et al. |
| 2017/0161618 | A1 | 6/2017 | Swaminathan et al. |
| 2017/0221155 | A1 | 8/2017 | Zabarsky et al. |
| 2019/0107935 | A1 | 4/2019 | Spivack et al. |
| 2019/0361982 | A1 | 11/2019 | Jacobson et al. |

OTHER PUBLICATIONS

Fabio V. Hecht, Thomas Bocek, Nicolas B"ar, Robert Erdin, Beat Kuster, Marium Zeeshan, Burkhard Stiller, Radiommender: P2P On-line Radio with a Distributed Recommender System, 2012, IEEE p. 73-74 (Year: 2012).

PCT International Search Report and Written Opinion, PCT Application No. PCT/US2017/015469, dated Apr. 20, 2017, 11 pages.

United States Office Action, U.S. Appl. No. 15/011,387, dated Apr. 19, 2019, 25 pages.

United States Office Action, U.S. Appl. No. 16/037,633, dated Dec. 3, 2019, 10 pages.

\* cited by examiner

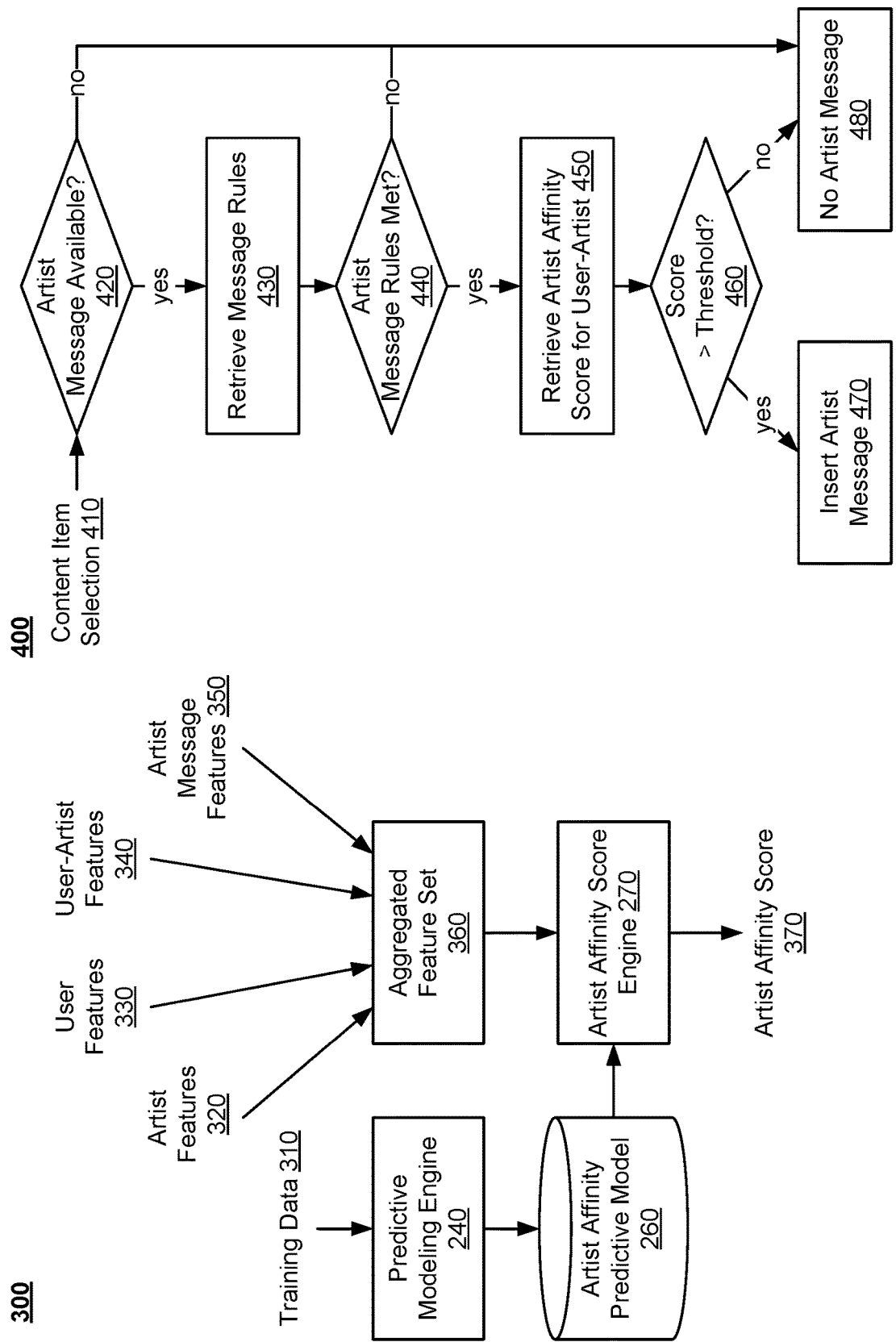

DELIVERING ARTIST MESSAGES TO LISTENERS BASED ON PREDICTED RESPONSES

CROSS-REFERENCE TO RELATED APPLICATIONS

This application is a continuation of U.S. Provisional application Ser. No. 16/037,633, filed on Jul. 17, 2018 which claims the benefit of U.S. Provisional Application No. 62/533,618, filed on Jul. 17, 2017, which is hereby incorporated by reference in its entirety.

BACKGROUND

Field of Disclosure

The present invention generally relates to digital content distribution via a network, and more specifically to selectively delivering electronic messages within a stream of digital content to particular users based on characteristics of the message creators and users.

Description of the Related Art

Many users utilize their digital devices to consume digital content. For example, a user may use a media application on his or her digital device to play a stream of linear audio content (e.g., songs) delivered over the Internet. To help users find content that they enjoy, some media applications allow users to create their own channels based on user-provided specifications, and the media applications select content to play on the channels according to the user-provided specifications. Selecting music that meet users' specifications and that users enjoy increases user engagement with the media application, and allows users to discover new songs and artists.

Some media applications also deliver messages interspersed into a stream of content requested by, or selected for, a user. For example, messages inserted into a content stream can thank a user for listening to the stream or some content item in the stream, or provide information to the listener. Current media applications do not consider how playing messages will affect user engagement with the media application, or the timing the playing of messages to maintain or increase user engagement. If the media application plays a message to a user who is uninterested in hearing messages generally, or is uninterested in hearing a particular message, this can provide a negative listening experience that causes the user to switch to a different channel or discontinue listening. On the other hand, if the media application only provides a message to users who have explicitly expressed an interest in the message, this can miss opportunities to provide the message to other users who would be interested in hearing the artist's message.

Determining when to play messages is particularly challenging in personalized media applications, which provide content to millions of different users via many millions of different personalized channels. In personalized media applications, the content played on personalized channels can be selected or modified during run-time, e.g., by selecting a next content item for a channel based on a user's reactions to earlier-played content items. Because of the dynamic nature of personalized channels, content selection involves making run-time decisions for thousands or millions of channels being delivered simultaneously. Current media applications do not have a way to deliver messages to the appropriate, interested users across millions of different personalized channels in a way that enhances user engagement with the media application.

SUMMARY

The above and other issues are addressed by a method, computer-readable medium, and digital content provider for inserting artist messages into content channels. The digital content provider delivers personalized content channels to many individual users; for example, a single user may have multiple different channels that play different types of music, and each channel is personalized to the user's tastes. The digital content provider receives an artist message, e.g., a spoken message recorded by an artist for the artist's fans. The digital content provider uses a predictive model to calculate an artist affinity score for a user relative to the artist who provided the message. The artist affinity score represents a likelihood that a particular user will provide positive feedback in response to a particular artist message (e.g., clicking on a link or icon associated with the message). The artist affinity score is based on features describing the artist who provided the message and features describing the user. The digital content provider may calculate artist affinity scores for many artists, across many potential recipient users. When the digital content provider determines to deliver a song by an artist who has recorded an artist message to a given user on a content channel, the digital content provider also determines, based on the artist affinity score, to deliver the artist message to that user on the channel. The digital content provider inserts the artist message adjacent to, or otherwise in association with, the song in the content stream it delivers to the user. Using pre-calculated artist affinity scores allows the digital content provider to manage insertion of artist messages across millions of channels during run time, as content streams are generated and delivered. In addition, by inserting artist messages into channels of selected users based on user-artist pairs with relatively high artist affinity scores, the digital content provider delivers a high quality listening experience for all users.

In an embodiment, a digital content provider selects an artist message provided by an artist. The selected artist message is delivered, via a computer network, in association with at least one content item by the artist on a plurality of digital content channels provided by the digital content provider. The digital content provider retrieves a predictive model that is trained to calculate an artist affinity score, which indicates a likelihood that a given user will provide positive feedback to the digital content provider in response to a given artist message. The predictive model is trained, using machine learning, based on feedback received at the digital content provider from a set of users for previous plays of a set of artist messages, features describing each of the users, and features describing artists that provided the artist messages in the set. The digital content provider also retrieves a set of artist features describing the artist that provided the selected artist message, and a set of user features describing a candidate user for receiving the selected artist message. The digital content provider calculates, using the predictive model, an artist affinity score representing an affinity of the candidate user for the artist that provided the selected artist message. The digital content provider determines to play a content item by the artist to the candidate user on a digital content channel associated with the candidate user. In response to determining to play the content item, the digital content provider determines, based at least in part on the artist affinity score, to play the selected artist message to the candidate user on the digital content channel. The digital content provider delivers, via the computer network, the content item and the selected artist message on the digital content channel.

BRIEF DESCRIPTION OF DRAWINGS

FIG. 3 is a flow diagram illustrating a process for calculating artist affinity scores, according to one embodiment.

FIG. 4 is a flowchart illustrating a process of determining whether to insert an artist message on a content channel, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

Figure 1:
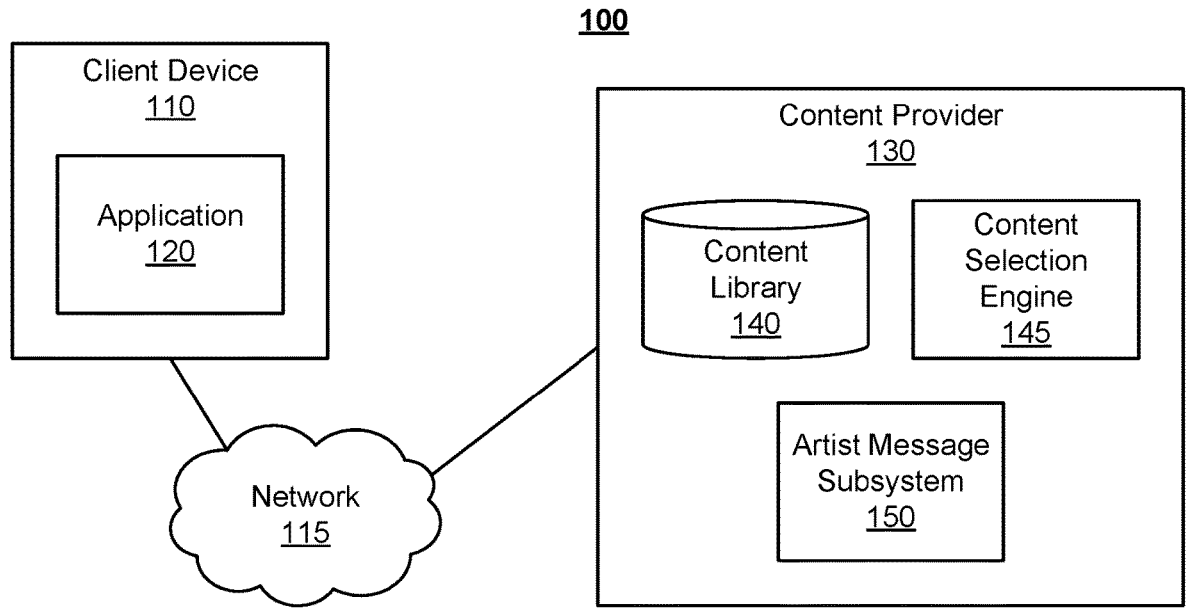
FIG. 1 is a high-level block diagram illustrating an embodiment of an environment for delivering content items and artist messages to users.

FIG. 1 is a high-level block diagram illustrating an embodiment of an environment 100 for delivering content items and artist messages to users. The environment 100 includes a client device 110 connected by a network 115 to a content provider 130. The content provider 130 delivers content, including artist messages, to the client device 110 via the network 115. Here, only one client device 110 and one content provider 130 are illustrated, but there may be additional instances of each of these entities. For example, there may be thousands or millions of client devices 110 in communication with one or more content providers 130.

The network 115 provides a communication infrastructure between the client devices 110 and the content provider 130. The network is typically the Internet, but may be any network, including but not limited to a Local Area Network (LAN), a Metropolitan Area Network (MAN), a Wide Area Network (WAN), a mobile wired or wireless network, a private network, or a virtual private network. The same network or a different network may also provide a communication infrastructure for various elements of the content provider 130.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to input and output sound (e.g., speakers and microphone) and images, connect to the network 115 (e.g., via Wifi and/or 4G or other wireless telecommunication standards), and detect user input (e.g., a mouse, a keyboard, a touch screen with capacitive or resistive touch sensors, a microphone coupled to a voice detection module, etc.).

The client device 110 includes an application 120 that allows interaction with the content provider 130. For example, the application 120 could be a browser that allows a user of the client device 110 to obtain content by browsing a web site of the content provider 130. As another example, the application 120 could be a dedicated application provided by the content provider 130 to enable interactions with a content service enabled by the content provider 130. In some embodiments, the application 120 communicates with the content provider 130 using API calls.

The application 120 presents content items responsive to a user selecting and/or creating a particular digital content channel. In one embodiment, the user uses the application 120 to send a seed for a content channel to the content provider 130. The seed describes what type of content channel the user would like formed. The value of a seed may be, e.g., a name of a song, a name of an artist or band, a name of genre of music, a combination of these items, etc. In some embodiments, the application 120 provides on-demand digital content channels curated by the content provider 130 that can be selected by the user. For example, on-demand content channels can be related to a genre, time period, or mood. In some embodiments, the application 120 provides on-demand digital content channels with content that is selected by the user, e.g., by selecting a particular album or artist, assembling songs from a library into a playlist, etc.

In some embodiments, as the user engages with a channel through the application 120, the channel becomes personalized to the user. For example, a user can create a channel that is based on a unique combination of several seeds. The channel is further personalized based on feedback that the user provides to the application 120 responsive to content items that the application 120 presents to the user. For example, the user may provide explicit positive feedback (e.g., a thumb up or other positive rating), implicit positive feedback (e.g., allowing a content item to play through to its end, without skipping the content item), or negative feedback (e.g., a thumb down, skip, or other negative feedback). The application 120 transmits the feedback to the content provider 130, and the content provider 130 can use the feedback to select content items for the channel that are more closely matched to the user's tastes and preferences. Thus, two channels created by two different users from the same seed may initially play similar content items. However, the two channels become distinct and personalized to their respective users as the users engage with their respective channels, e.g., by adding seeds and/or providing feedback.

In addition to content items such as songs, the application 120 provides messages from artists to users. An artist is an entity, such as a person, group of persons, organization, or anything or anyone else that participates in the creation of a content item. Examples of artists include singers, bands, a studio, an artist, a writer, and so on. An artist message is content (e.g., audio, video, or images) created by an artist. In a streaming audio context, an artist message includes a sound file that is inserted into an audio stream. For example, an artist message may be an audio recording created by an artist to deliver a message to listeners of that artist's media items. An artist message may be classified as one of a set of possible message types based on the message content. For example, artist messages can include thank you messages, which thank a user for listening; promotional messages, which promote an upcoming concert or merchandise; and recommendation messages, which recommend that a user listen to other songs or albums by the artist or an affiliated artist.

The application 120 may provide a user interface for the artist messages. The user interface can include a message title, message attachment, action indicator, feedback elements, and/or controls. The message title indicates a title of the artist message (e.g., the name of the artist, media item, channel, a generic title such as "Artist Message," or a title set by the artist). The attachment provided with the message may be an image or video that the artist included in the artist message, or a default image that the content provider 130 associates with the artist. The action indicator allows the listener to interface with a "call to action" included in the artist message (e.g., visit a website, make a purchase, play a media item, consume an extended artist message). The feedback elements allow the listener to provide positive or negative feedback (e.g., thumb up and thumb down) in response to an artist message that is presented. The controls allow a user to skip, pause, or play the artist message.

The content provider 130 selects content items for playing on content channels and transmits the selected content items to the client device 110. The content provider 130 also determines to insert artist messages on select content channels. For example, an artist message recorded by an artist can be inserted in a content channel before or after a content item by that artist. The content provider 130 may be implemented by one or more servers. The content provider 130 includes a content library 140, a content selection engine 145, and an artist message subsystem 150. In other embodiments, the content provider 130 includes additional or alternative components from those shown in FIG. 1.

The content library 140 is a library of content items that are or can be provided by the content provider 130 to the client device 110. The content library 140 includes metadata for content items, and in some embodiments, also stores the content items. Metadata is data that describes a content item. For example, metadata for a song can include artist, song name, album name, length, etc. Metadata can also include musicological features that describe the musicological characteristics of the content items, e.g., the gender of the singer, the type of background vocals, the quality of the tones (e.g., pure or distorted), whether the melody dominates the composition, and an amount of gospel influence. A given content item may be described by many features, such as 100-500 features. In one embodiment, the mapping of content items to media features is established using the MUSIC GENOME PROJECT database created by PANDORA MEDIA, INC. of Oakland, Calif. The content library 140 can include other types of metadata, e.g., the provider of a content item, a value associated with the content item, one or more categories associated with the content item, etc. In some embodiments, the content library 140 stores data describing the artists who created the content items. For example, the artist data can include data describing each artist's genre or genres, the artist's popularity in terms of overall plays and positive feedback, language or country of origin, etc.

In some embodiments, the content library 140 stores the content items in addition to the metadata, and serves the content items to the client device 110 via the network 115. In other embodiments, the content library 140 stores data describing where to retrieve the content items, and the content items are stored separately (e.g., on a separate streaming server). In such embodiments, the content items the client device 110 retrieves content items based on data provided by the content provider 130.

The content selection engine 145 selects content items from the content library 140 for playing on the channels provided to the client devices 110. In response to a request from a client device 110 to play content on a given channel, the content selection engine 145 determines one or more content items to provide to the client device 110 for playing next on the channel. For example, the content selection engine 145 may have a content selection mechanism for each channel provided by the content provider 130. The content selection mechanism for a channel selects content from the content library 140 based on data describing the channel, including one or more seeds, received user feedback, and recently played content items. Various content items may be surfaced to the content selection engine 145 as recommendations. For example, the content selection engine 145 may receive recommendations from one or more subsystems (not shown) for finding content items that are musicologically similar to the channel seeds and/or content that received positive feedback on the channel. The content selection engine 145 selects among the recommended content items to determine the content item or items to play next. The content selection engine 145 may select content items that achieve one or more objectives, such as providing a good user experience, optimizing benefit to the content provider 130, and avoiding ramifications of not selecting certain content. The content selection engine 145 may predict user experience of different content items based on historical performance of other content items on the channel, as determined through recorded user feedback.

The artist message subsystem 150 receives artist messages from artists and inserts the artist messages into selected content channels, among content items selected by the content selection engine 145. For a given artist message, or for a given artist who provides one or more artist messages, the artist message subsystem 150 calculates, for each user of a set of users (e.g., all users of the content provider 130, or some subset of users) an artist affinity score for the user-artist pair. A user-artist pair is a pair of an artist who provided an artist message and a candidate user for receiving the artist message. The artist affinity score represents the likelihood that a user will provide positive feedback to a message from the artist. In some embodiments, the artist affinity score is calculated for a user, artist, and particular artist message provided by an artist, and the artist affinity score for a user-artist-message triple represents the likelihood that a user will provide positive feedback to the particular message from the artist. Examples of positive feedback include providing a thumb up or selecting a link in the action indicator for the call to action in the user interface. Positive feedback may also include allowing the artist message to play through to the end. Examples of negative feedback include providing a thumb down, skipping the artist message, or changing to a different channel.

For a selected artist message, based on the calculated artist affinity scores for the artist relative to the set of users, the artist message subsystem 150 determines to provide the artist message to some subset of the user set. The artist message subsystem 150 inserts the artist message into a content stream of a content channel delivered to the selected portion of users, in association with a content item by the artist who provided the artist message. For example, the artist message subsystem 150 may insert the artist message adjacent to the content item (i.e., immediately before or after), or within some number of songs or time period of the content item. As another example, the artist message subsystem 150 may instruct the application 120 to simultaneously play the artist message and the content item, e.g., by playing the artist message during an intro or outro of a song. The artist message subsystem 150 may further base the determination to provide the artist message to a user on one or more criteria or rules, such as a frequency cap for artist messages and a geographic filter for message relevancy.

By using the artist affinity score to determine when to play an artist message, the artist message subsystem 150 transmits a given artist message to users who are likely to respond positively to that artist message. The user's experience with the content provider 130 is therefore enhanced by the artist message, and the user is likely to continue listening to the content channel on which the artist message is played and continue to engage with the application 120. If the user selects a call to action included with the message, such as a link to purchase concert tickets or visit the artist's website, this also provides a positive result for the artist. Conversely, the artist message subsystem 150 avoids playing the artist message to users who are not likely to respond positively to that artist message, which avoids creating negative user experiences for these users.

As noted above, the content provider 130 can provide content to millions of different users, each using one or more corresponding client devices 110. Each user may create multiple channels using the application 120 on the user's respective client device 110. For example, a single user may create 50 channels. Across all of the users, the number of channels managed by the content provider 130 can be in the tens or hundreds of millions. Artist messages are typically played adjacent to a song by the artist (i.e., immediately prior to or after a song by the artist), and the content selection engine 145 may select songs for playing to each user in near-real time, based on user selections and feedback received at the content provider 130 from the application 120.

So that it can keep pace with the content selection engine 145, the artist message subsystem 150 also determines when to play artist messages on each channel in near-real time, responsive to the song selected for playing by the content selection engine 145. The artist message subsystem 150 can efficiently perform this decision-making during run time by using the artist affinity score. Prior to run-time, the artist message subsystem 150 pre-calculates and stores artist affinity scores for user-artist pairs. During run-time, when the content selection engine 145 selects a particular content item to play to a particular user, the artist message subsystem 150 retrieves a relevant artist affinity score for the user and content item and determines whether to play the artist message. This determination may be based on the artist affinity score as well as a set of rules regarding artist messages that can be efficiently evaluated in real time. Pre-calculating the artist affinity scores allows the content provider 130 to efficiently and effectively determine when to insert artist messages across a high volume of users and channels. In alternate embodiments, the artist affinity score may be computationally simple enough that the artist message subsystem 150 can calculate or re-calculate artist affinity scores in real time, e.g., an artist affinity score is unavailable or stale.

In one particular embodiment referred to throughout the remainder of the specification, the content item is digital audio content, such as a song, piece of music, artist message, sponsored message, or other type of audio recording. It is appreciated, however, that in other embodiments a content item alternatively and/or additionally includes other forms of digital content, such as a video, movie, slideshow, or image. Thus, subsequent references to content items or other audio-related terminology could equally apply to (for example) viewing videos or otherwise experiencing media provided by the content provider 130 in other embodiments.

Figure 2:
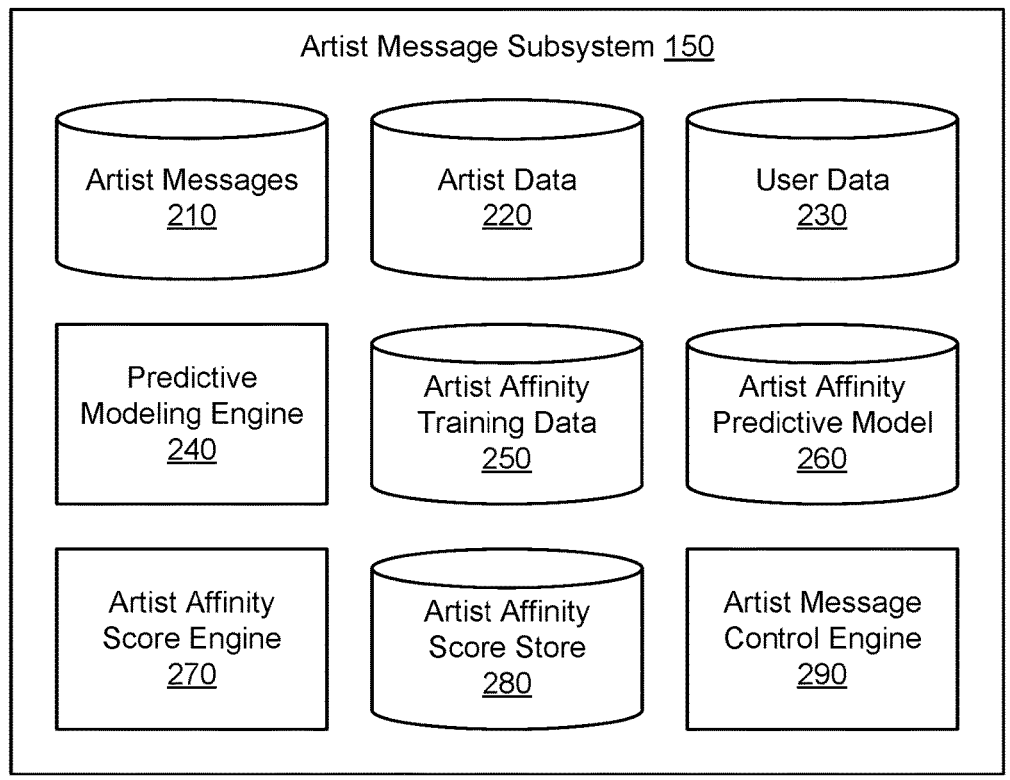
FIG. 2 is a block diagram illustrating a detailed view of an artist message subsystem, according to one embodiment.

FIG. 2 is a block diagram illustrating a detailed view of the artist message subsystem 150, according to one embodiment. The artist message subsystem 150 may be implemented by one or more servers, e.g., an artist message server. The artist message subsystem 150 is comprised of modules including a database of artist messages 210, a database of artist data 220, a database of user data 230, a predictive modeling engine 240, a database of artist affinity training data 250, an artist affinity predictive model 260, an artist affinity score engine 270, an artist affinity score store 280, and an artist message control engine 290. Some embodiments of the artist message subsystem 150 have different modules than those described here. The functions can be distributed among the modules in a different manner than is described here.

The database of artist messages 210 includes messages received from artists, features describing each artist message, message rules indicating when to play the messages, and any other data related to a message. As noted above, the message includes one or more of an audio file, an image file, and a video file. In a streaming audio context, the message typically includes an audio file, e.g., a spoken message recorded by an artist. The message data can include information that a user can use to respond to a "call to action" included in the message. For example, the message can include one or more links that a user can select to visit a website, make a purchase, play a media item, or obtain an extended message. As another example, the visual component of a message can include further information about an artist's concerts or public appearances.

The features describing each artist message can include features describing the content of the artist message and/or users' responses to the artist message. Artist message features include data indicating the type of artist message, e.g., thank you, promotional, or recommendation. Artist message features may describe the content of the message in more detail, e.g., text of one or more words spoken by the artist in the artist message, or text included the visual component of the message. Artist message features may also include data describing prior user responses to the artist message, such as data describing trends in users' reactions to the artist message from different times or different contexts in which the message was played.

The database of artist messages 210 also includes artist message rules. In some embodiments, an artist message can be targeted to a specific context or some specific set of users. The artist message subsystem 150 uses the artist message rules in the database of artist messages 210 to filter the playing of artist messages so that messages are played in appropriate contexts and to appropriate users. The message rules can be provided by the artist or the artist's label, or set by the content provider 130. Examples of message rules include temporal rules, geographic rules, and track rules. A temporal rule dictates the playing of artist messages according to time constraints, e.g., an artist message is eligible to be played between 9 am and 5 pm, or an artist message is eligible during a particular 2 week period (e.g., in the lead up to an album release). A geographic rule selects users for receiving artist messages according to geographic constraints, e.g., an artist message is eligible to be played to users in a geographic region specified by a geographic rule. The geographic rule may be defined by postal codes, geographic radiuses, states, countries, or other options for specifying location. A track rule dictates the playing of artist messages according to constraints related to content items selected by the content selection engine 145. For example, a track rule can specify that the artist message is played adjacent to particular tracks by the artist, e.g., tracks from the artist's most recent album. The database of artist messages 210 may include other rules, such as rules based on user demographic information (e.g., age, language), client device characteristics, strength of network connection, etc. Any of the rules may be implemented as filters for preventing an artist message from being inserted into a particular user's content channel.

The database of artist data 220 stores data describing the artists providing artist messages, referred to as artist features. The artist features include data describing the artist's history within the content service provided by the content provider 130, such as the length of time that music by the artist has been included in the content library 140. The artist features also include data describing the artist's popularity on the content service provided by the content provider 130, such as the number of listeners that have created stations seeded by the artist or the artist's music, the number of times that the artist's music has been played recently (e.g., within a rolling time period, such as the past two weeks, past month, past 3 months, etc.), and the total number of times that the artist's music has been played by the content provider 130.

The database of user data 230 stores data describing users' listening habits and feedback habits, referred to as user features. Listening habit data includes, for example, the number of artist-seeded stations that a user has, the number of stations to which the user regularly listens, and the amount of time that the user spends listening to content on the media application. The listening habit data can be data describing listening habits over a rolling time period, e.g., over the past month. Feedback habit data includes, for example, the number of artists for which the user has provided feedback, and the number of songs for which the user has provided feedback for recently, e.g., over the past month.

The database of user data 230 also stores data describing users' prior interactions with specific artists on the content service. This data is referred to as user-artist features. Exemplary user-artist features for a pair of a user and an artist (i.e., a user-artist pair) include whether the user has an artist-seeded station for the artist, and if so, whether the user has listened to the artist-seeded station recently (e.g., within a threshold amount of time). User-artist features may also include the number of times the user has provided feedback for the artist's songs, whether the feedback has been positive or negative, and how recently the feedback was received. Additional exemplary user-artist features include the number of distinct songs by the artist the user has listened to, the number of times that the user listened to a complete song by an artist, and the number of times that the user skipped a song by the artist or changed the station when a song by the artist was played. The user feature data may also include demographic and/or psychographic features data such as age, gender, location, occupation, interests, activities, etc.

The predictive modeling engine 240 applies machine learning techniques to generate the artist affinity predictive model 260 based on data in the database of artist affinity training data 250. The artist affinity training data 250 includes data describing previous plays of artist messages and feedback received from users in response to the artist messages. To generate the artist affinity training data 250, the content provider 130 provides a set of artist messages to a set of client devices 110. The artist messages may be artist messages 210 that are delivered based on the artist message rules (e.g., geographic rules, temporal rules, etc.), other generally applicable rules, a user's calculated affinity for an artist, or other factors. Any client device 110 that receives a song by the artist who recorded an artist message may be eligible to receive the artist message, even if the user does not have a high affinity for the artist or for receiving artist messages. The artist message subsystem 150 stores artist affinity training data 250 that describes whether feedback was received from the client device 110, the type of feedback received, and feature data describing the receiving user and the artist of the artist message, including artist features, user features, and user-artist features. In some embodiments, the artist affinity training data 250 also includes artist message features describing the artist message. In an embodiment, the stored feature data is the feature data that was available to the content provider 130 at the time that the artist message was transmitted, and does not include feature data describing activity that occurred after the delivery of the artist message.

The predictive modeling engine 240 retrieves features describing some or all of the previous plays of artist messages in the artist affinity training data 250. The predictive modeling engine 240 uses supervised machine learning to train the artist affinity predictive model 260 to provide a likelihood of positive feedback to a message from the artist based on inputs from the artist affinity training data 250, namely artist features, user features, and user-artist features, and, optionally, artist message features. Different machine learning techniques, such as linear support vector machine (linear SVM), boosting for other algorithms (e.g., AdaBoost), neural networks, logistic regression, naive Bayes, memory-based learning, random forests, bagged trees, decision trees, boosted trees, or boosted stumps, may be used in different embodiments. The artist affinity predictive model 260, when applied to the features for a user-artist pair, outputs the likelihood of positive feedback from the user responsive to an artist message from the artist based on a set of artist features, user features, and user-artist features. If the artist affinity predictive model 260 is also trained based on artist message features, the artist affinity predictive model 260, when applied to features describing a user-artist pair and a particular artist message, outputs the likelihood of positive feedback from the user to the particular artist message based on artist features, user features, user-artist features, and artist message features.

The artist affinity score engine 270 calculates an artist affinity score for artist messages in the database of artist messages 210 with respect to some or all of the users of the content service. For a particular artist message, the artist affinity score engine 270 may identify a set of candidate users for receiving an artist message based on relationships between the users and the artist. For example, candidate users can include any users in one or more countries in which the artist has a presence, users who have a common language with the artist, users who have listened to a song by the artist, or users that fit some other rough filter for selecting eligible candidate users. In other embodiments, candidate users include all users of the content provider 130. For a candidate user-artist pair, the artist affinity score engine 270 retrieves the artist features, the user features, and the user-artist features from the databases of artist data 220 and the user data 230. The artist affinity score engine 270 retrieves the artist affinity predictive model 260 and calculates an artist affinity score for the candidate user with respect to the artist who provided the message. The artist affinity score indicates a likelihood that the candidate user will provide positive feedback in response to a message from the artist. If artist message features are also used to calculate the artist affinity score, the artist affinity score engine 270 also retrieves the artist message features from the database of artist messages 210, and calculates an artist affinity score for the user-artist-message triple; this artist affinity score indicates a likelihood that the candidate user will provide positive feedback in response to the particular artist message. In some embodiments, the artist affinity score engine 270 concatenates the retrieved features (e.g., the artist features, the user features, and the user-artist features), e.g., using the input format for the Vowpal Wabbit program, and inputs the concatenated features into the artist affinity predictive model 260.

The artist affinity score engine 270 stores calculated artist affinity scores in the artist affinity score store 280. The artist affinity score store 280 stores data identifying a user-artist pair and the artist affinity score associated with this user-artist pair. If the artist affinity score is specific to a given artist message, the artist affinity score store 280 stores data identifying a user-artist-message triple and the associated artist affinity score. In some embodiments, the artist affinity score store 280 also stores a time at which each artist affinity score was calculated. The artist message subsystem 150 may determine whether to update an artist affinity score based on the time at which it was calculated, e.g., if the artist affinity score has become stale. For example, the artist message subsystem 150 may compare the amount of time that has passed since the time at which the score was last calculated to a threshold score age, and calculate a new score if the amount of time exceeds the threshold score age. As another example, the artist message subsystem 150 compares the time at which score was last calculated to a time at which new feature information was added to the artist data 220 or user data 230, and calculate a new score if new feature information was added after the score was last calculated.

The artist message control engine 290 determines whether to deliver an artist message by an artist to the client device 110 of a candidate user based on the artist affinity score of the candidate user-artist pair and other rules regarding message delivery. The artist message control engine 290 retrieves the artist affinity score from the artist affinity score store 280 and compares the retrieved artist affinity score to a threshold. In some embodiments, different types of artist messages have different threshold affinity scores. For example, a message thanking a user for listening may have a relatively low affinity score threshold, while a message promoting an upcoming concert or an album release has a higher affinity score threshold. In such embodiments, the artist message control engine 290 identifies the message type and selects the threshold for the artist message based on the message type.

In addition to determining if the artist affinity score for a particular user-artist pair is sufficiently high, the artist message control engine 290 also analyzes a set of rules for determining whether to deliver the artist message to a particular user. The artist message control engine 290 retrieves the message rules stored in the database of artist messages 210 and compares the relevant data for the potential delivery of the artist message to the rule. For example, to apply a geographic filter, the artist message control engine 290 retrieves information describing the user's location (e.g., from the user data 230, or based on location information retrieved from the client device 110), and compares the user's location to the geographic region indicated by the geographic filter to determine whether the user is eligible to receive the artist message. As another example, to apply a temporal filter, the artist message control engine 290 compares the current time to the time for playing the artist message to determine whether the artist message is eligible to be played.

The artist message control engine 290 may also apply rules that apply generally to delivery of artist messages. For example, the artist message control engine 290 may implement rules regarding the frequency or repetition of artist message delivery, e.g., deliver artist messages to a single user a maximum of once per hour, or deliver the same artist message to a single user a maximum of once per day.

FIG. 3 is a flow diagram illustrating a process 300 for calculating artist affinity scores using the artist message subsystem 150, according to one embodiment. Training data 310 from the database of artist affinity training data 250 is input to the predictive modeling engine 240. The predictive modeling engine 240 generates the artist affinity predictive model 260, as described with respect to FIG. 2. The predictive modeling engine 240 may update the artist affinity predictive model 260 on a periodic basis (e.g., weekly or monthly) based on additional training data 310 gathered using additional artist messages. In the embodiment shown in FIG. 3, the training data 310 includes the artist, user, user-artist features, and artist message features available to the artist message subsystem 150 at the time that the artist messages were delivered to users. For example, while additional user features may be learned after an artist message was sent to a user, the user features used by the predictive modeling engine 240 to train the artist affinity predictive model are not updated based on the newly learned user features.

When an artist message is received at the artist message subsystem 150, the artist features 320 for the artist who recorded the artist message are retrieved from the database of artist data 220. For each of a set of users, the user features 330 and user-artist features 340 are retrieved from the database of user data 230. The artist message features 350 for the artist message are retrieved from the database of artist messages 210. For one of the users in the set, the artist features 320, user features 330, user-artist features 340, and artist message features 350 are aggregated (e.g., concatenated) to form the aggregated feature set 360. The aggregated feature set 360 is input to the artist affinity score engine 270. The artist affinity score engine 270 retrieves the artist affinity predictive model 260 and applies the artist affinity predictive model 260 to the aggregated feature set 360 to calculate an artist affinity score 370. The artist message subsystem 150 generates the aggregated feature set 360 and calculates the artist affinity score 370 using the artist affinity score engine 270 for each triple of candidate user, artist, and artist message. The artist affinity scores 370 may be stored in the artist affinity score store 280.

The artist features 320, user features 330, user-artist features 340, and artist message features 350 may be updated on a regular basis, based on information received at the content provider 130 about user activity on the media application 120. When the artist features 320, user features 330, user-artist features 340, or artist message features 350 for a user-artist-message triple are updated, this results in a new aggregated feature set 360 for the user-artist-message triple, and may result in a different artist affinity score 370 from an earlier-calculated score. So that the artist message control engine 290 has an accurate assessment of the users' affinities for artist messages, the artist affinity scores may be recalculated regularly. For example, when artist message features 350 or artist features 320 for a particular artist message are updated, the artist affinity score engine 270 selects the artist message and calculates a new artist affinity score for a user-artist-message triple in response to the update. As another example, the artist affinity score engine 270 calculates new artist affinity scores for each user-artist-message triple on a periodic basis, e.g., once per day. As another example, the artist affinity score engine 270 updates artist affinity scores on an as-needed basis, e.g., in response to a decision by the content selection engine 145 to play a song by an artist with an artist message to an eligible user, the artist affinity score engine 270 selects the artist message and eligible user and updates the artist affinity score for the user-artist-message triple. In some embodiments, the artist affinity score engine 270 updates scores in response to a decision by the content selection engine 145 to play the song and in response to determining that the score stored in the artist affinity score store 280 is stale, e.g., if additional feature data has been received since the stored score was calculated.

FIG. 4 is a flowchart illustrating a process 400 of determining whether to insert an artist message on a content channel, according to one embodiment. The steps of FIG. 4 may be performed by the artist message control engine 290. Some or all of the steps may be performed by other modules in other embodiments. In addition, other embodiments may include different and/or additional steps and the steps may be performed in different orders.

At the start of the process 400, the artist message control engine 290 receives a content item selection 410 for playing on a content channel of a particular user. The content item selection 410 is selected by the content selection engine 145 and passed to the artist message subsystem 150. The content item selection 410 includes data identifying an artist of the content item. The artist message control engine 290 determines 420 whether an artist message from the artist of the content item selection 410 is available. If the content item selection 410 is by multiple artists (e.g., a list of two or more artists collaborating on a song), the artist message control engine 290 may determine whether an artist message from the first listed artist is available, or may determine if an artist message from any listed artist is available. If more than one artist on a content item has an artist message available, the artist message control engine 290 may select the artist message from the artist that is listed earliest in the list of artists.

If the artist message control engine 290 determines that no artist message is available, the artist message control engine 290 delivers no artist message 480. If the artist message control engine 290 identifies an available artist message, the artist message control engine 290 retrieves 430 the message rules associated with the identified artist message from the database of artist messages 210.

The artist message control engine 290 determines 440 whether the retrieved artist message rules are met. The artist message control engine 290 may also retrieve other information used to apply the artist message rules, e.g., data describing artist messages recently to the user, or data describing the user's location. If the artist message control engine 290 determines that one or more of the artist message rules are not met, the artist message control engine 290 delivers no artist message 480.

If the artist message control engine 290 determines that the artist message rules are met, the artist message control engine 290 retrieves 450 the artist affinity score for the user-artist pair from the artist affinity score store 280. The artist message control engine 290 may also retrieve a threshold that is based on the type of the identified artist message. The artist message control engine 290 determines 460 whether the score exceeds the threshold. If the score exceeds the threshold, the artist message control engine 290 inserts 470 the artist message into the content stream for the content channel, e.g., before or after the content item selection. If the score does not exceed the threshold, the artist message control engine 290 delivers no artist message 480.

Figure 5:
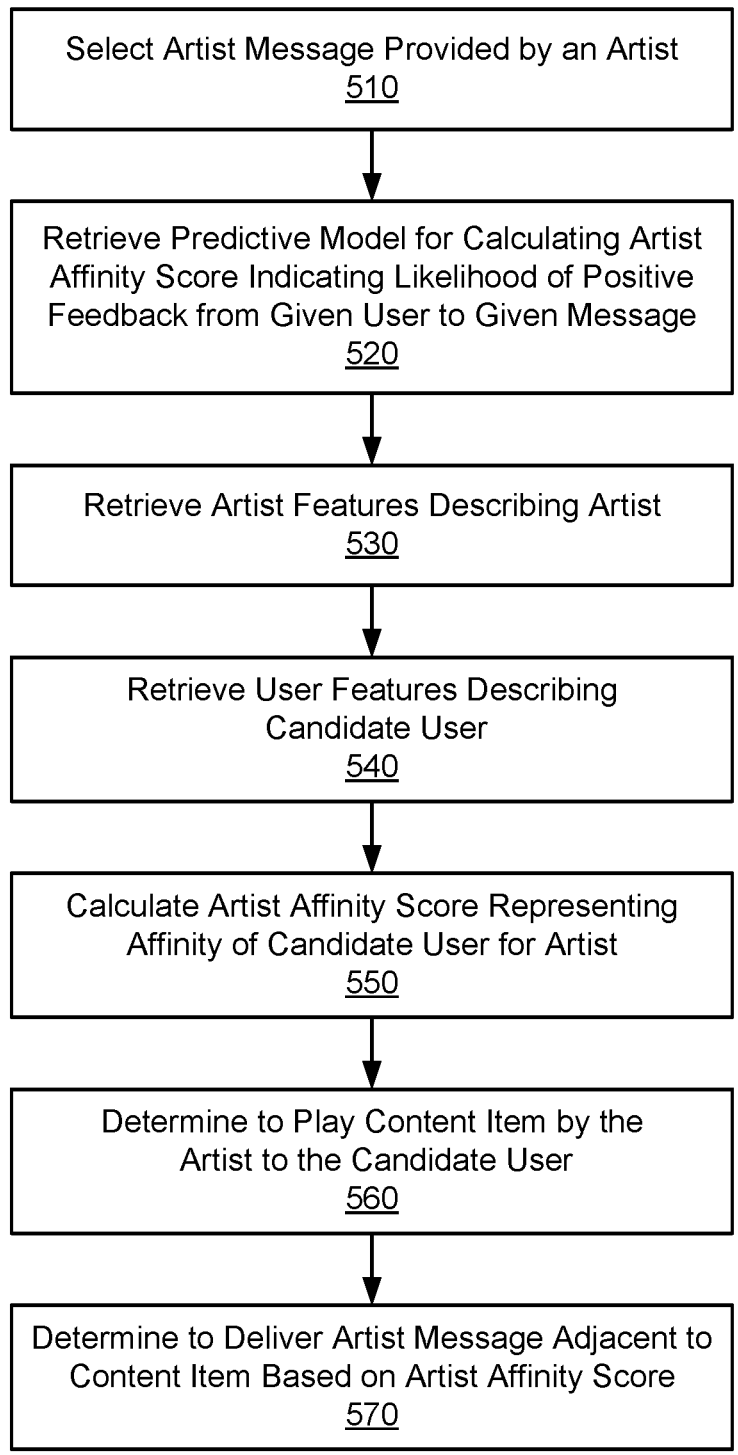
FIG. 5 is a flowchart illustrating a process of inserting an artist message into a content channel, according to an embodiment.

FIG. 5 is a flowchart illustrating a process 500 of inserting an artist message into a content channel, according to an embodiment. The steps of FIG. 5 may be performed by the content provider 130 as described below. Some or all of the steps may be performed by other modules in other embodiments. In addition, other embodiments may include different and/or additional steps and the steps may be performed in different orders.

The content provider 130 selects an artist message provided by an artist. For example, an artist records a message and transmits it to the content provider 130, and the artist message subsystem 150 receives the artist message, stores it in the database of artist messages 210, and selects the received artist message. Alternatively, the content provider 130 selects an artist message already stored in the database of artist messages 210, e.g., to update one or more artist affinity scores related to the artist message.

The content provider 130 retrieves 520 a predictive model for calculating an artist affinity score that indicates a likelihood of positive feedback from a given user to a given artist message. For example, the artist affinity score engine 270 retrieves the artist affinity predictive model 260.

The content provider 130 retrieves 530 features describing the artist who recorded the artist message. For example, the artist affinity score engine 270 retrieves artist features 320 from the database of artist data 220.

The content provider 130 also retrieves 540 user features describing a candidate user. For example, the artist affinity score engine 270 retrieves user features 330 and user-artist features 340 from the database of user data 230 for a candidate user for receiving the artist message. The candidate user may be selected by the artist affinity score engine 270 based on a relationship between the candidate user and the artist observed at the content provider 130, as described with respect to FIG. 2. In some embodiments, the artist affinity score engine 270 identifies a set of candidate users for the artist.

The content provider 130 calculates 550 the artist affinity score representing the affinity of the candidate user for the artist. The artist affinity score indicates a likelihood of positive feedback from the candidate user to the artist message. For example, the artist affinity score engine 270 concatenates the artist features 320, user features 330, and user-artist features 340, inputs the features into the artist affinity predictive model 260, and receives an artist affinity score from the predictive model 260. If the artist affinity score engine 270 has identified a set of candidate users, the artist affinity score engine 270 may calculate 550 the artist affinity scores for each candidate user in the set with respect to the artist. The artist affinity score engine 270 stores the artist affinity scores in the artist affinity score store 280.

The content provider 130 determines 560 to play a content item by the artist to the candidate user. For example, the content selection engine 145 selects a song by the artist to play to one of the candidate users in the set of candidate users.

The content provider 130 determines 570 to deliver the artist message adjacent to the content item based on the calculated artist affinity score. For example, the artist message control engine 290 retrieves the artist affinity score for the candidate user from storage and determines that the artist affinity score is greater than a threshold for delivering the artist message to the candidate user. The artist message control engine 290 may also determine that one or more rules related to the artist message or to the delivery of artist messages generally are satisfied. These determinations are made during run-time, responsive to each content item selected for each channel managed by the content provider 130. In response to determining to deliver the artist message, the content provider 130 transmits the artist message and the song via the network 115 to a client device 110, and the client device 110 plays the artist message either before or after the song.

Figure 6:
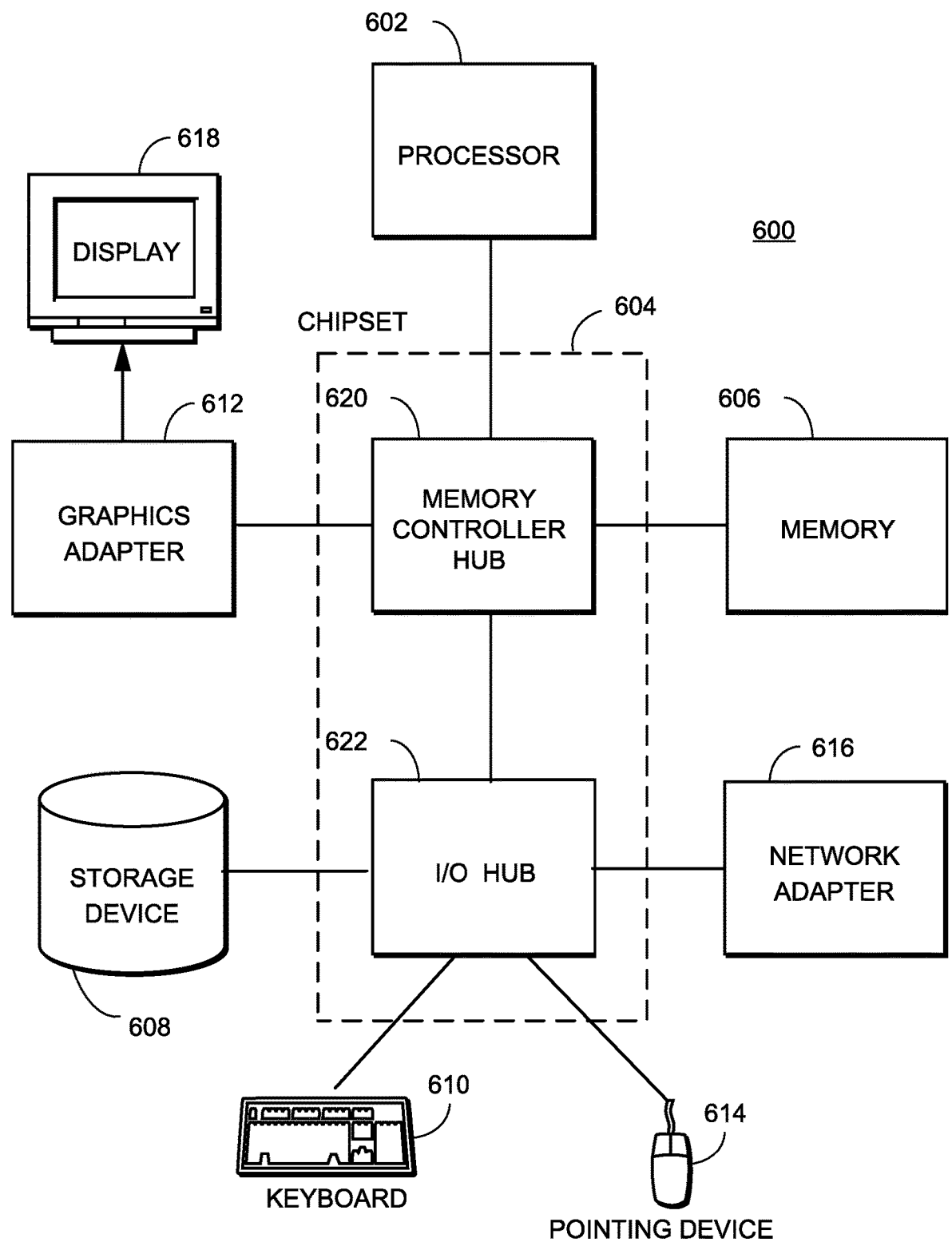
FIG. 6 is a high-level block diagram illustrating an example computer for implementing the client device or content provider of FIG. 1.

FIG. 6 is a high-level block diagram illustrating an example computer 600 for implementing the client device and/or content provider of FIG. 1. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, an input device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The input interface 614 is a touch-screen interface, a mouse, track ball, or other type of pointing device, a keyboard, or some combination thereof, and is used to input data into the computer 600. In some embodiments, the computer 600 may be configured to receive input (e.g., commands) from the input interface 614 via gestures from the user. The graphics adapter 612 displays images and other information on the display 618. The network adapter 616 couples the computer 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIG. 1 can vary depending upon the embodiment and the processing power required by the entity. The computers 600 can lack some of the components described above, such as graphics adapters 612, and displays 618. For example, the content provider 130 can be formed of multiple blade servers communicating through a network such as in a server farm.

OTHER CONSIDERATIONS

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for featuring a media content item. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method for inserting an artist message into a content channel comprising:
   selecting, by a digital content system, an artist message provided by an artist;
   retrieving a predictive model trained using machine learning to calculate an artist affinity score indicating a likelihood that a given user of a plurality of users will provide positive feedback to the digital content provider in response to a given artist message;
   retrieving a set of artist features describing the artist that provided the selected artist message;

retrieving a set of user features describing a candidate user for receiving the selected artist message;

determining, using the predictive model, a set of artist affinity scores each representing an affinity of the candidate user for each of a set of artists providing artist messages, the set of artists including the artist providing the selected artist message, the set of artist affinity scores comprising an artist affinity score representing an affinity of the candidate user for the artist that provided the selected artist message;

storing the set of artist affinity scores for the candidate user in a data store;

determining to play a content item by the artist to the candidate user on a digital content channel associated with the candidate user;

in response to determining to play the content item, determining, based at least in part on the artist affinity score representing the affinity of the candidate user for the artist providing the selected artist message from the data store, to play the selected artist message to the candidate user on the digital content channel; and delivering, via the computer network, the content item and the selected artist message on the digital content channel.

2. The method of claim 1, wherein:

the set of artist features comprise features related to the popularity of the artist on a content service provided by the digital content provider and features related to history of the artist with the content service; and the set of user features comprise features collected by the digital content provider describing listening habits of the candidate user, prior feedback of the candidate user, and prior interactions by the candidate user with artist on the content service.

3. The method of claim 1, the method further comprising:

retrieving a set of features describing the selected artist message;

wherein the predictive model is further trained based on features describing the artist messages, and wherein the artist affinity score is calculated based on the retrieved set of features describing the selected artist message.

4. The method of claim 1, wherein determining to play the selected artist message to the candidate user on the digital content channel comprises:

identifying a message type of the selected artist message;

selecting a threshold score from a plurality of threshold scores based on the message type;

comparing the artist affinity score to the selected threshold score; and in response to determining that the artist affinity score is greater than the selected threshold score, determining to play the selected artist message to the candidate user on the digital content channel.

5. The method of claim 1, wherein determining to play the selected artist message to the candidate user on the digital content channel comprises:

retrieving a geography filter indicating a relevant geographic area for the selected artist message;

retrieving data describing a geographic location of the candidate user; and determining to play the selected artist message to the candidate user on the digital content channel in response to determining that the geographic location of the candidate user is within the relevant geographic area indicated by the geographic filter.

6. The method of claim 1, wherein the digital content channel is a streaming channel through which digital content is streamed to the candidate user during a streaming session.

7. The method of claim 6, wherein the selected artist message is delivered to the candidate user for playback adjacent to playback of the content item during the streaming session.

8. A non-transitory computer-readable storage medium comprising memory with instructions encoded thereon, the instructions when executed by one or more processors causing the one or more processors to perform operations, the instructions comprising instructions to:

select, by a digital content system, an artist message provided by an artist;

retrieve a predictive model trained using machine learning to calculate an artist affinity score indicating a likelihood that a given user of a plurality of users will provide positive feedback to the digital content provider in response to a given artist message;

retrieve a set of artist features describing the artist that provided the selected artist message;

retrieve a set of user features describing a candidate user for receiving the selected artist message;

determine, using the predictive model, a set of artist affinity scores each representing an affinity of the candidate user for each of a set of artists providing artist messages, the set of artists including the artist providing the selected artist message, the set of artist affinity scores comprising an artist affinity score representing an affinity of the candidate user for the artist that provided the selected artist message;

store the set of artist affinity scores for the candidate user in a data store;

determine to play a content item by the artist to the candidate user on a digital content channel associated with the candidate user;

in response to determining to play the content item, determine, based at least in part on the artist affinity score representing the affinity of the candidate user for the artist providing the selected artist message from the data store, to play the selected artist message to the candidate user on the digital content channel; and deliver, via the computer network, the content item and the selected artist message on the digital content channel.

9. The non-transitory computer-readable storage medium of claim 8, wherein:

the set of artist features comprise features related to the popularity of the artist on a content service provided by the digital content provider and features related to history of the artist with the content service; and the set of user features comprise features collected by the digital content provider describing listening habits of the candidate user, prior feedback of the candidate user, and prior interactions by the candidate user with artist on the content service.

10. The non-transitory computer-readable storage medium of claim 8, wherein the instructions further comprise instructions to:

retrieve a set of features describing the selected artist message;

wherein the predictive model is further trained based on features describing the artist messages, and wherein the artist affinity score is calculated based on the retrieved set of features describing the selected artist message.

11. The non-transitory computer-readable storage medium of claim 8, wherein the instructions to determine to play the selected artist message to the candidate user on the digital content channel comprise instructions to:
identify a message type of the selected artist message;
select a threshold score from a plurality of threshold scores based on the message type;
compare the artist affinity score to the selected threshold score; and
in response to determining that the artist affinity score is greater than the selected threshold score, determine to play the selected artist message to the candidate user on the digital content channel.

12. The non-transitory computer-readable storage medium of claim 8, wherein the instructions to determine to play the selected artist message to the candidate user on the digital content channel comprise instructions to:
retrieve a geography filter indicating a relevant geographic area for the selected artist message;
retrieve data describing a geographic location of the candidate user; and
determine to play the selected artist message to the candidate user on the digital content channel in response to determining that the geographic location of the candidate user is within the relevant geographic area indicated by the geographic filter.

13. The non-transitory computer-readable storage medium of claim 8, wherein the digital content channel is a streaming channel through which digital content is streamed to the candidate user during a streaming session.

14. The non-transitory computer-readable storage medium of claim 13, wherein the selected artist message is delivered to the candidate user for playback adjacent to playback of the content item during the streaming session.

15. A system comprising a computer processor for executing computer program instructions, and a non-transitory computer-readable storage medium storing computer program instructions executable by the processor to perform operations comprising:
selecting, by a digital content system, an artist message provided by an artist;
retrieving a predictive model trained using machine learning to calculate an artist affinity score indicating a likelihood that a given user of a plurality of users will provide positive feedback to the digital content provider in response to a given artist message;
retrieving a set of artist features describing the artist that provided the selected artist message;
retrieving a set of user features describing a candidate user for receiving the selected artist message;
determining, using the predictive model, a set of artist affinity scores each representing an affinity of the candidate user for each of a set of artists providing artist messages, the set of artists including the artist providing the selected artist message, the set of artist affinity scores comprising an artist affinity score representing an affinity of the candidate user for the artist that provided the selected artist message;
storing the set of artist affinity scores for the candidate user in a data store;
determining to play a content item by the artist to the candidate user on a digital content channel associated with the candidate user;
in response to determining to play the content item, determining, based at least in part on the artist affinity score representing the affinity of the candidate user for the artist providing the selected artist message from the data store, to play the selected artist message to the candidate user on the digital content channel; and
delivering, via the computer network, the content item and the selected artist message on the digital content channel.

16. The system of claim 15, wherein:
the set of artist features comprise features related to the popularity of the artist on a content service provided by the digital content provider and features related to history of the artist with the content service; and
the set of user features comprise features collected by the digital content provider describing listening habits of the candidate user, prior feedback of the candidate user, and prior interactions by the candidate user with artist on the content service.

17. The system of claim 15, the operations further comprising:
retrieving a set of features describing the selected artist message;
wherein the predictive model is further trained based on features describing the artist messages, and wherein the artist affinity score is calculated based on the retrieved set of features describing the selected artist message.

18. The system of claim 15, wherein determining to play the selected artist message to the candidate user on the digital content channel comprises:
identifying a message type of the selected artist message;
selecting a threshold score from a plurality of threshold scores based on the message type;
comparing the artist affinity score to the selected threshold score; and
in response to determining that the artist affinity score is greater than the selected threshold score, determining to play the selected artist message to the candidate user on the digital content channel.

19. The system of claim 15, wherein determining to play the selected artist message to the candidate user on the digital content channel comprises:
retrieving a geography filter indicating a relevant geographic area for the selected artist message;
retrieving data describing a geographic location of the candidate user; and
determining to play the selected artist message to the candidate user on the digital content channel in response to determining that the geographic location of the candidate user is within the relevant geographic area indicated by the geographic filter.

20. The system of claim 15, wherein the digital content channel is a streaming channel through which digital content is streamed to the candidate user during a streaming session.

* * * * *